(12) United States Patent
Yang et al.

(10) Patent No.: US 9,499,680 B2
(45) Date of Patent: Nov. 22, 2016

(54) HYDROXYETHYL CELLULOSE GRAFTED ACRYLIC LATEX

(71) Applicants: Benjamin Moore & Co., Montvale, NJ (US); Columbia Insurance Company, Omaha, NE (US)

(72) Inventors: Shi-Jun Yang, Maple Glen, PA (US); Gary Dandreaux, River Edge, NJ (US); Robert J. Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 115 days.

(21) Appl. No.: 14/343,292

(22) PCT Filed: Sep. 18, 2012

(86) PCT No.: PCT/US2012/055883
§ 371 (c)(1),
(2) Date: Mar. 6, 2014

(87) PCT Pub. No.: WO2013/043579
PCT Pub. Date: Mar. 28, 2013

(65) Prior Publication Data
US 2014/0228514 A1    Aug. 14, 2014

Related U.S. Application Data

(60) Provisional application No. 61/536,264, filed on Sep. 19, 2011.

(51) Int. Cl.
| | |
|---|---|
| C08L 1/08 | (2006.01) |
| C08F 6/00 | (2006.01) |
| C08K 3/20 | (2006.01) |
| C08B 11/08 | (2006.01) |
| C08B 11/20 | (2006.01) |
| C08F 251/02 | (2006.01) |
| C08F 8/10 | (2006.01) |
| C09D 151/02 | (2006.01) |
| C08L 1/28 | (2006.01) |

(52) U.S. Cl.
CPC ............ *C08K 3/20* (2013.01); *C08B 11/08* (2013.01); *C08B 11/20* (2013.01); *C08F 6/006* (2013.01); *C08F 8/10* (2013.01); *C08F 251/02* (2013.01); *C09D 151/02* (2013.01); *C08L 1/08* (2013.01); *C08L 1/284* (2013.01)

(58) Field of Classification Search
CPC .......... C08K 3/20; C08B 11/20; C08B 1/08; C08L 1/08; C08L 1/284
USPC ........................ 524/813, 607, 457, 555, 608
See application file for complete search history.

(56) References Cited

U.S. PATENT DOCUMENTS

| | | | |
|---|---|---|---|
| 3,838,104 A | | 9/1974 | Hayashi et al. |
| 4,151,147 A | * | 4/1979 | Neuschwanter ...... C08F 220/12 524/833 |
| 5,795,928 A | * | 8/1998 | Janssen .................... C08F 2/24 524/48 |
| 5,869,590 A | | 2/1999 | Clark et al. |
| 5,912,293 A | | 6/1999 | Stockwell et al. |
| 2008/0058473 A1 | | 3/2008 | Freidzon et al. |

FOREIGN PATENT DOCUMENTS

CN    101817906 A    9/2010

OTHER PUBLICATIONS

Machine translation of CN 101817906 A, Sep. 1, 2010.

* cited by examiner

*Primary Examiner* — Kelechi Egwim
(74) *Attorney, Agent, or Firm* — The H.T. Than Law Group

(57) ABSTRACT

The present invention relates to latex compositions comprising hydroxyethyl cellulose grafted acrylic polymer emulsions and methods for preparing same without gelling or coagulation. The latex composition comprises at least about 0.2% of HEC by weight relative to the monomer weight, contains at least about 45% solid, and the average mean volume (mV) latex particle size is in the range of about 320-about 850 nm. Paint compositions incorporating the HEC grafted acrylic latex show high viscosity at static conditions and have no color flow and no syneresis compared paints containing a latex without HEC grafting. The present invention also relates to a cross-linking mechanism that cross-links latex particles at ambient conditions. This cross-linking mechanism comprises diacetone acrylamide (DAAM) and methacrylamide (MAM) with or without styrene.

27 Claims, 1 Drawing Sheet

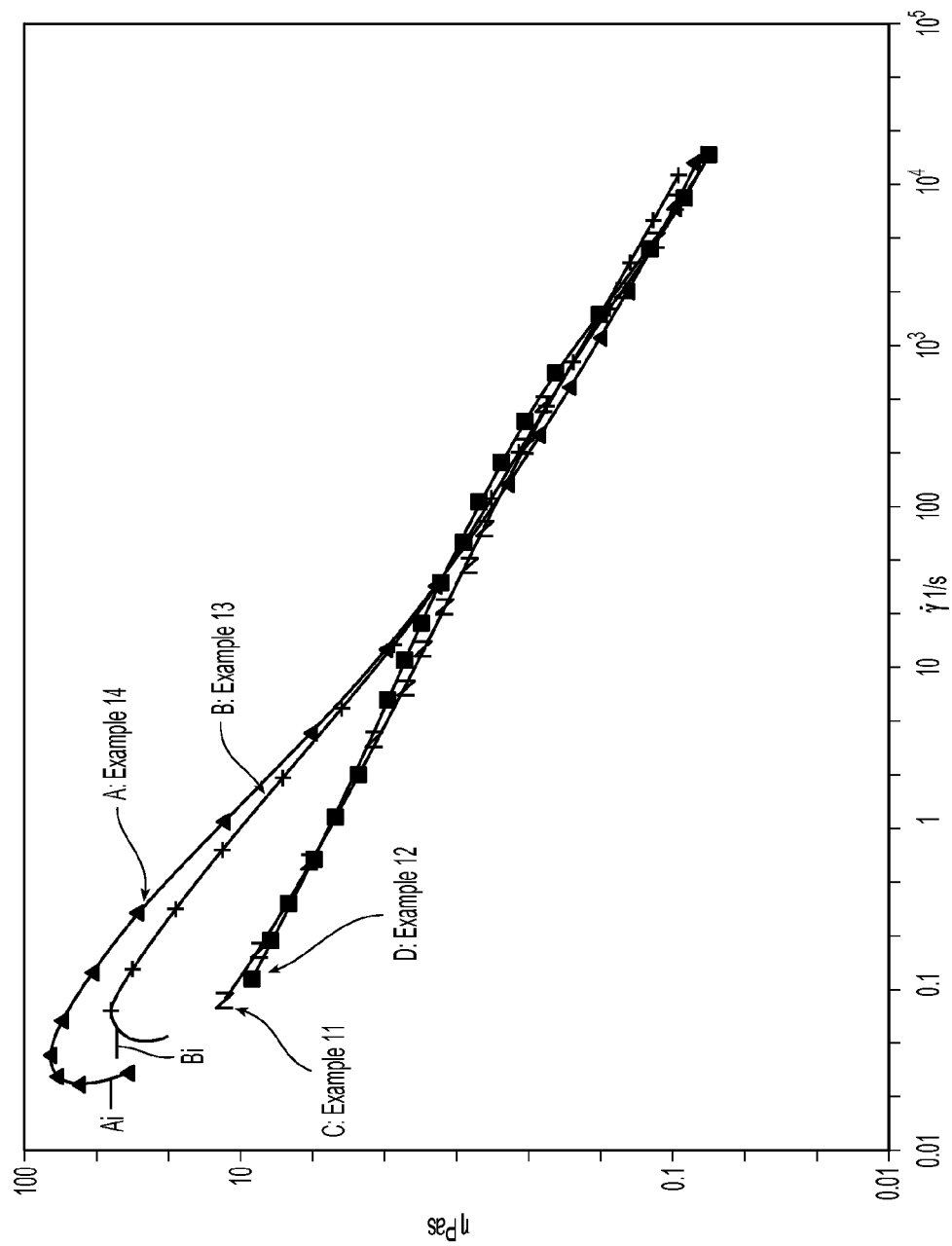

HYDROXYETHYL CELLULOSE GRAFTED ACRYLIC LATEX

FIELD OF THE INVENTION

This invention generally relates to latex compositions comprising hydroxyethyl cellulose grafted acrylic polymer emulsions and methods for preparing same.

BACKGROUND OF THE INVENTION

Hydroxyethyl cellulose (HEC) and other hydrophilic polymers, such as polyvinyl alcohol and vinylpyrrolidone copolymers, have been used in the paint industry as protective colloids to improve the mechanical stability of the composition. HEC is commonly used in emulsion polymerization involving vinyl acetate compositions. Recent publications reported that vinyl acetate monomer does not readily graft to HEC under normal emulsion polymerization conditions due to lack of reactivity of vinyl acetate monomer towards carbon radicals. (See U.S. Pat. No. 4,684,704; Craig, D. in Polymeric Materials Science and Engineering, 51, 172 (1984); 54, 370 (1986), etc.). The latexes prepared by emulsion polymerization of vinyl acetate or other vinyl esters and HEC lack mechanical stability.

Acrylic monomers are more reactive towards HEC and have a higher HEC grafting potential. A highly HEC grafted all acrylic emulsion latex would provide mechanical stability, excellent dry film performance, and good compatibility with many hydrophilic components in paint formulations. However, one of the issues of grafting HEC to acrylic monomers is the gelation problem during the grafting reaction in the emulsion polymerization. Although there are published references that teach the methods of grafting HEC onto acrylic polymers, most of those published references have some practical issues for commercial practice, because of poor reproducibility and stability, or low level of grafting, or odor issues associated with the use of waterborne regulators (chain transfer agents), such as 2-mercaptoethanols, in the polymerization process.

Various attempts have been carried out to produce HEC grafted acrylic polymer. For example, different additives have been added in the process. Craig, D. H. ("The Synthesis of Hydroxyethyl Cellulose-Stabilized Acrylic Latexes", Polymeric Materials Science and Engineering, 51, 172 (1984)) teaches a method of making HEC grafted acrylic polymer latex using waterborne regulators, such as 2-mercapto ethanol. However, the use of waterborne chain transfer agents often results in an odor problem during and after the production. U.S. Pat. No. 3,876,596 to Grubert et al. teaches an emulsion copolymerization process of carboxylic acid esters and protective colloids in the presence of a relatively large amount of emulsifier mixtures. Too much emulsifier can have a negative effect on water-sensitivity of the system and causes foaming U.S. Pat. No. 4,670,505 to Craig and U.S. Pat. No. 4,659,771 to Craig disclose HEC-grafted polyacrylate dispersions produced by emulsion polymerization in the presence of water-soluble amino alcohol compounds, or substantially completely water-soluble monomers having conjugated unsaturation, respectively. However, Craig reports that the grafting reaction between HEC and polyacrylate polymer is reduced by these additives.

Other examples include a method of post treatment of acrylic emulsions with HEC and initiators disclosed in U.S. Pat. No. 6,596,804 to Edwards et al. U.S. Pat. No. 5,795,928 to Janssen et al. prepares an acrylic copolymer in the presence of a water soluble protective colloid with a weight average molecular weight of less than about 75,000. U.S. Pat. No. 4,845,175 to Lo uses hydrophobically modified hydroxyethyl cellulose. However, these acrylic emulsions do not produce paint formulations that have great mechanical stability and exhibit the resistance to color float and syneresis.

HEC grafted acrylic polymers taught in the art, however, have significant drawbacks. HEC is a hydrophilic and water soluble polymer. When HEC is grafted to acrylic particles, a dried film formed from HEC grafted acrylic latex often suffers from inferior water sensitivity. When the grafted HEC becomes a part of the dried film structure in the continuous phase, the water sensitivity becomes more apparent.

Hence, there remains a need for developing novel formulations and processes to produce a highly HEC grafted acrylic polymer dispersions with high polymer solids and desirable particle size distribution without gelling problems. There also remains a need to improve the water sensitivity of the HEC grafted acrylic dried film.

SUMMARY OF THE INVENTION

A first embodiment of the invention relates to latex compositions comprising hydroxyethyl cellulose (HEC) grafted acrylic polymer emulsions. The HEC grafted acrylic polymer emulsions comprises at least about 0.2% of HEC by weight relative to the acrylic monomers, wherein polymer contains at least about 45% solid, wherein the average mean volume (mV) particle size of the acrylic core is between about 150 nm and about 280 nm, and wherein the latex particle size is in the range of about 320 to about 850 nm (mV) on average.

Another embodiment is directed to HEC grafted latex compositions wherein the latex comprises acrylic monomers, styrene monomers, and methyl acrylamide monomers. A small amount of methacrylamide/acrylamide/styrene combination of monomers can be added to the typical acrylic monomers. A preferred balanced film performance was achieved using the combination of methacrylamide/diacetoneacrylamide/styrene in the following concentrations: about 0.1-about 1.0% of methacrylamide, about 0.1-about 1.0% of diacetoneacrylamide, and about 1.0-about 10.0% of styrene, in addition to acrylic monomers for architectural coatings.

In another embodiment, methacrylamide and acrylamide, such as diacetone acrylamide, with or without styrene are used as self-crosslinking compounds at ambient conditions when the latex compositions are applied on a substrate or surface, but not in the aqueous phase.

In another embodiment of the invention, the acrylic latex compositions comprise methylolmethacrylamide monomers (from about 0.1% to about 5% relatively to the total amount of monomers) to improve latex stability and the dry film's water permeability.

In another embodiment of the invention, the acrylic latex compositions comprise acrylic monomers mixed with a small amount of monomers with amide and aromatic function groups (from about 0.1% to about 10% relative to the total amount of monomers) to ensure effective grafting.

Another aspect of the invention relates to methods for preparing hydroxyethyl cellulose grafted acrylic polymer comprising emulsion polymerization without gelling problems, wherein pH value, initial feed rate, solid level, particle size distribution, and surfactants are controlled and no waterborne regulator/chain transfer agent is used.

In one embodiment, the HEC is added into reactor water phase before the start of the polymerization. The neutralization of acrylic monomers and slow conversion during the initial period of the grafting reaction, preferably less than 28% monomer conversion in the first hour, and less than 68% monomer conversion after two hours, are used to avoid gelling. The percent monomer conversion was measured using polymer solids calculated based on the total monomers used for the reaction batch. The initial surfactant concentrations are kept lower to ensure effective HEC grafting and workable latex viscosity.

In another embodiment, the HEC solution is added gradually with about 10% to about 40% monomer pre-emulsion and extra surfactants. In this process, the HEC solution is fed gradually with about 10% to about 40% monomer pre-emulsion and additional surfactants after the acrylic polymer conversion reached about 90% to about 60%. Additional surfactants are added at this stage into the HEC/monomer mixture to achieve desired particle size distributions and prevent latex from undesired gelling. The initial feeding rate is preferably controlled so that the average particle size (mV) of acrylic core is maintained above 160 nm during HEC grafting. The average particle size (mV) of acrylic core is controlled between about 160 nm and about 280 nm at the end of about 90% to about 60% acrylic polymer conversion before adding the HEC solution. Surfactants for the present invention preferably contain a combination of anionic sulfosuccinate, anionic sulfosuccinamate, branched alcohol ethoxy phosphate, and an ammonium salt of phosphate ester.

A further embodiment of the invention relates to a two-step seed addition method to increase polymer solids in the HEC grafted acrylic compositions without gelling or coagulation problems. HEC is added in the water phase before adding seed monomer emulsion. The first portion of polymer conversion is controlled to have less than about 30% solids, preferably about 10% to about 30% solids, and the particle size distribution is monitored to make sure it is unimodal distribution. After the reaction mixture is cooled down and chasers have been added to reduce residual monomers, the mixture is neutralized and then additional surfactants, initiator, and monomer emulsions are added as a second portion of polymer conversion.

Another aspect of the invention relates to paint compositions incorporating the HEC grafted acrylic latex.

A variation embodiment relates to paint compositions incorporating the HEC grafted latex comprising acrylic, styrene, and methyl acrylamide monomers.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is rheological curves for comparisons of inventive HEC grafted paints in Example 13 and 14 and comparative non-HEC-grafted controls in Examples 11 and 12.

DETAILED DESCRIPTION OF THE INVENTION

The present invention generally relates to (i) latex compositions comprising HEC-grafted acrylic latex, wherein the solid content is at least about 45% by weight and HEC is at least about 0.2% by weight and wherein the average particle size (mV) of the acrylic core is between about 160 nm and about 280 nm and the average latex particle size is about 320 to about 850 nm, among other things, (ii) methods for their preparation, wherein pH value, initial feed rate, solid level, particle size distribution, and surfactants are controlled in the emulsion polymerization process and/or no waterborne regulator/chain transfer agent is used, and (iii) paint compositions incorporating the inventive HEC-grafted acrylic latex.

The inventive HEC-grafted acrylic latex provides several advances over those disclosed in the existing art. Generally, when the HEC concentration is less than 0.2% vs. total monomers or the polymer solid is below 35%, gelling is unlikely in known acrylic compositions. However, if the polymer solid is higher than 35%, or HEC concentration is above 0.2% vs. total monomers, gelling is more likely to occur under normal emulsion polymerization conditions described in the prior art. The current invention provides methods for stable grafting reactions without gelling problems and produces acrylic latex with high solid content and high HEC concentration. No waterborne regulator/chain transfer agent is needed in the current invention, thereby eliminating the odor problem associated with waterborne regulators/chain transfer agents. Furthermore, the water sensitivity issue of HEC grafted acrylic latex polymers is resolved using a novel combination of methacrylamide/acrylamide/styrene monomers in addition to the acrylic monomers used for architectural coating applications. This improvement is believed to be from strong hydrogen bonding and post cross-linking activities. The scrub resistance of the HEC grafted acrylic polymer film is also improved. The latex samples made by the current invention have a balanced performance in paint formulations and good mechanical stability.

One aspect of the invention is directed to HEC grafted latex. The latex polymer may comprise all acrylic monomers, as shown in Examples 1-3 and 8-9, and at least one of (i) a combination of methacrylamide/acrylamide/styrene monomers as shown in Examples 4 and 6, or (ii) a relatively small amount of monomers with amide and aromatic functional groups as disclosed in Examples 4 and 6. The invention optionally uses methylol methacrylamide monomer to improve latex stability and the dried film's water permeability, as shown in Examples 1, 8, and 9. Preferably, the latex contains less than about 700 ppm of gels.

Any acrylic monomers can be used in the present invention. Suitable acrylic monomers include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and methacrylate, isobornyl acrylate and methacrylate, methoxy ethyl acrylate and methacrylate, 2-ethyoxy ethyl acrylate and methacrylate, dimethylamino ethyl acrylate and methacrylate, acrylates, alkyl(meth)acrylic acids such as methyl acrylic acids, wet adhesion monomers, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, and combinations thereof. The alkyl methacrylate monomer is preferable methyl methacrylate.

Preferred monomers containing aromatic groups are styrene and a-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethyl)styrene, 3-fluorostyrene, α-methylstyrene, 3-vinylbenzoic acid, 4-vinylbenzyl chloride, α-bromostyrene, 9-vinylanthracene, and combinations thereof. Preferred monomers containing amide groups are methacrylamide, diacetone acrylamide, and acrylamide. Other suitable monomers containing amide groups include, but are not limited to, N-vinylformamide, or any vinyl amide, N,N-dimethylacrylamide, N-(1,1-dimethyl-3-oxobutyl)(meth)acrylamide, N-(hydroxymethyl)(meth)acrylamide, N-(3-methoxypropyl)acrylamide, N-(butoxymethyl)acrylamide, N-(isobutoxymethyl)acryl(methacryl)amide, N-[tris(hydroxymethyl)methyl]acryl(methacryl)amide, 7-[4-(trifluoromethyl)coumarin](meth)acrylamide, 3-(3-fluorophenyl)-2-propenamide, 3-(4-methylphenyl)acrylamide, N-(tert-butyl)(meth)acrylamide, and combinations thereof. These monomers can be polymerized with acrylic monomers, listed above. General formula for vinyl(form)amides:

CH$_2$=CR1-NH—COR2
and (meth)acrylamides:

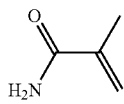

CH$_2$=CR1-CO—NH—R2
Where R1 is H, CH$_3$, CH$_2$CH$_3$, or other substituted functional groups, and R2 can be H, CH$_3$, CH$_2$CH$_3$, and other substituted organic functional groups.

Suitable styrene monomers include, but are not limited to, styrene, methylstyrene, chlorostyrene, methoxystyrene and the like. In this embodiment, styrene monomers are preferably polymerized with methacrylamide and acrylamide polymers.

Another aspect of the invention is directed to the processes of making the HEC-grafted latex by polymerization. There are at least two different approaches for achieving stable grafting reactions. In one approach, solid HEC is added into reactor water phase before the polymerization, as shown in Examples 1-3. In another approach, HEC solution is added gradually with about 10-about 40% monomer pre-emulsion and extra surfactants, as shown in Examples 4-6 and 8-9. Both methods avoid the gelling and coagulation challenges associated with HEC grafting to acrylic monomers.

In the Ruiner approach, when HEC is added to the water phase before polymerization, the neutralization of acrylic monomers and slow conversion during the first hour of the grafting reaction, preferably less than 28% monomer conversion in the first hour, and less than 68% monomer conversion after two hours, are used to avoid gelling. The percent monomer conversion was measured using polymer solids calculated based on the total monomers used for the reaction batch. This method produces a stable emulsion latex and higher degree of grafting. The latex dispersions do not show negative effects, such as gelling, odors and syneresis. The paint formulation made from this latex shows excellent flow and leveling, resistance to syneresis and color float.

In the later approach, the HEC solution is added gradually with about 10% to about 40% monomer pre-emulsion and extra surfactants. In this process, the HEC solution is fed gradually with about 10% to about 40% monomer pre-emulsion and additional surfactants after the acrylic polymer conversion reached about 90% to about 60%. Additional surfactants are added at this stage into the HEC/monomer mixture to achieve desired particle size distributions and prevent latex from undesired gelling. This is a preferred method for production scale up and has a reliable control of particle size distribution. The grafting can be confirmed by a separation/extraction method and also by a rheological test.

The control of the pH of the monomer pre-emulsion, initial feed rate, solid level, and particle size, and choices of the surfactants combinations during the grafting reaction can be utilized to produce highly HEC-grafted acrylic dispersion with high polymer solids and desirable particle size distributions. The average particle size (mV) of acrylic core is sensitive to gelling and particle average size may negatively affect the flow and leveling performance of the final paint formulations. In a preferred embodiment, controlling the initial average particle size of acrylic particles avoids gelling during the HEC grafting reaction. When the average particle size of acrylic core is relatively small, for example less than about 120 nm, gelling is more likely to occur, and the final paint formulation would have poor flow/leveling. The inventors of the present invention have discovered that when the average particle size (mV) of acrylic composition is controlled above about 160 nm during the HEC grafting, mechanical stability is improved, gelling tendency is reduced, and the flow and leveling properties are less affected.

The initial surfactant concentrations are maintained at a relatively low level to ensure effective HEC grafting and workable latex viscosity. The surfactants for present invention preferably contain a combination of anionic sulfosuccinate, anionic sulfosuccinamates, branched alcohol ethoxy phosphate, and an ammonium salt of phosphate ester. Exemplary surfactants in the preparation of the emulsion according to the invention include, but are not limited to, dioctyl sodium sulfosuccinate (Aerosol OT, or other effective wetting/leveling agents), and tetrasodium N-(1,2-dicarboxyethyl)-N-octadecyl sulfosuccinamate (Aerosal 22), and Tristyrylphenol ethoxylate (POE 16) phosphate ester (or other similar arylphenol ethoxylate phosphate ester), etc.

Other suitable surfactants in the preparation of the inventive emulsion may include, but are not limited to, nonionic and/or anionic surfactants such as anionic and/or nonionic emulsifiers such as alkali or ammonium alkyl sulfates, alkyl sulfonic acids, fatty acids, oxyethylated alkyl phenols, ammonium nonoxynol-4 sulfate, nonylphenol ethoxylate (10), octylphenol ethoxylate (9-10), sodium dodecylbenzene sulfonate, sodium dodecyl sulfonate, sodium tetradecyl sulfonate, sodium hexadecyl sulfonate, those sold under the tradename TRITON™ (e.g., QS series, CF series, X series, and the like), those sold under the tradename IGEPAL™, those sold under the tradename RHODAPON™, those sold under the tradename RHODAPEX™, those sold under the tradename RHODAFAC™, those sold under the tradename RHODACAL™, and the like, and combinations thereof.

Either thermal or redox initiation processes may be used to initiate the polymerization. Conventional free radical initiators may be used such as, for example, hydrogen peroxide, t-butyl hydroperoxide, and ammonium, sodium, or alkali persulfates, potassium persulfate, redox systems such as sodium hydroxymethanesulfinate (reducer) and t-butyl-hydroperoxide (oxidizer), and the like, and combinations thereof. Either or both of these components can optionally contain an additional surfactant and/or a pH adjustor, if desired to stabilize the emulsion.

Examples of initiators and chaser solutions useful in the latex compositions according to the invention include, but are not limited to, ammonium persulfate, sodium persulfate, potassium persulfate, redox systems such as sodium hydroxymethanesulfinate (reducer) and t-butyl-hydroperoxide (oxidizer), and the like, and combinations thereof, typically in an aqueous solution. Either or both of these components can optionally contain an additional surfactant and/ or a pH adjustor, if desired to stabilize the emulsion.

Examples of pH adjustors useful in the compositions according to the invention include, but are not limited to, ammonium hydroxide, sodium hydroxide, sodium carbonate, sodium bicarbonate, potassium hydroxide, potassium carbonate, potassium bicarbonate, ammonium salts, ammonia, amines, aminoalcohols (e.g., 2-amino-2-methyl-1-propanol and/or those compounds sold under the tradename AMP™ 95 by Angus Chemical Co.), and the like, and combinations thereof. Preferred pH adjustors include ammonia, amines and aminoalcohols. In certain cases, compounds that qualify as pH adjustors can be added for purposes other than adjusting pH (e.g., temporary deactivation of otherwise reactive functional groups, emulsion stabilization, or the like), and yet may be still characterized herein as pH adjustors.

A further embodiment of the invention relates to a two-step seed addition method to increase polymer solids in the HEC grafted acrylic compositions without gelling or coagulation problems, as shown in Example 17. The polymerization process contains two stages. In the first stage, HEC is added in the water phase before adding seed monomer emulsion. The first portion of polymer conversion is controlled to have less than about 30% solids, preferably about 10% to about 30% solids, and the particle size distribution is monitored to make sure it is unimodal distribution. After the reaction mixture is cooled down and chasers have been added to reduce residual monomers, the mixture is neutralized with sodium hydroxide or ammonia hydroxide until pH is in the range of about 8.0 to about 8.8. Additional surfactants, initiator, and monomer emulsions are then added as a second portion of polymer conversion.

Another aspect of the present invention involves a paint composition comprised of the HEC-grafted acrylic latex of the current invention, as shown in Examples 13 and 14. Paint formulations using the HEC-grafted acrylic latex of the current invention exhibit the advantages of substantially no or no color float, and substantially no or no syneresis in a formulation which exhibits both when formulated with a control sample, as shown in the Examples 10-12 below. As shown in FIG. 1, the rheological curves (viscosity vs. shear rate) of Examples 13 and 14 show higher low shear viscosity and a "yield value' which is not present in the curves of the paints in Examples 10 and 11 using the control latex in Example 12 and having free HEC added to it. Those results indicate that the HEC in the HEC-grafted acrylic latex is not free. Extraction studies by a centrifuge method also confirm that HEC in the HEC-grafted acrylic latex is not free. Paint formulations using the HEC-grafted acrylic latex of the current invention also exhibit high sag while maintaining flow and leveling, open time improvement, better brushability (less drag) and creaminess. Moreover, the water resistance of the HEC grafted film is dramatically improved. The scrub resistance is also improved. FIG. 1 is described in detail below.

EXAMPLES

Particle size distribution is determined by Microtrac 250 particle size analyzer using light scattering technology.

Rheological curves are measured by a Bohlin CVO Rotational Viscometer (0.5° cone and 40 mm diameter plate).

The water sensitivity test (1 minutes and 5 minutes water spot test) is defined by the following procedures. The emulsion latex samples were drawn clown on a sealed Draw Down card (made by BYK for example) to form a dry film using a BYK-GARDNER 3 MIL WET FILM draw down bar. The latex film was air-dried on a flat horizontal surface for one week before testing. To the dried film surface, 3-5 drops of water were placed and the water sensitivity of the latex film was rated using finger nail scratching method for rating the dry film strength after 1 minute and 5 minute soaking. The rankings are 1 to 4, with 4 being the best.

Example 1

To a 5-liter 4-necked round bottom glass reactor equipped with a mechanical stirrer, thermocouple, condenser, and nitrogen purge, 888.7 g of deionized (DI) water, and 4.60 g of hydroxyethyl cellulose (DOW Chemicals, WP-09H) were added and agitated for at least 20 minutes or more at 40° C.-50° C. to form a clear aqueous solution.

6.6 g of methacrylic acid monomer was added into 255.0$_g$; of DI water and 5.8 g of ammonium hydroxide (28%) was added to neutralize the solution and to bring pH to about 8.0-9.0.

The components in the following table were added into the above solution and agitated for 20-30 minutes to form monomer emulsion.

| | |
|---|---|
| Sodium dioctyl sulfosuccinate surfactant (Aerosol OT-75) | 8.1 g |
| Sodium dodecylbenzosulfonate (branched) surfactant | 2.8 g |
| Methyl methacrylate (MMA) monomer | 458 g |
| Butyl acrylate (BA) monomer | 441 g |
| N-(2-methacryloyloxyethyl)ethylene urea wet adhesion monomer | 20 g |
| Optionally: methylol methacrylamide monomer | 13 g |

Aerosol OT75 is a surfactant made by Cytec Industries. Suitable examples for the wet adhesion monomer include Rohamere 6844-O and Rohamere 6852-O (50%) supplied by Evonik Industries. After the monomer emulsion became stable, 58 g of this emulsified monomer mix and 15 g of 10.8% potassium persulfate (KPS) initiator solution were added to the 5-liter flask containing pre-dissolved HEC. The kettle temperature was raised to 78° C. until the exothermal peak started to level off, which took about 20 minutes.

Monomer emulsion delay feed was started at about 2.5 g/minutes for 60 minutes and the feed rate was increased in order for the reaction to be competed in about 4.5 hours. 4.5% potassium persulfate (KPS) initiator solution was co-fed with the monomer at 0.09 ml/minute. The reaction temperature was maintained at 78° C. and agitation speed at 165 RPM. After monomer feed is done, hold the reactor temperature at 82° C. for additional 30-60 minutes to complete the polymerization. The reactor was cooled down to about 65° C. with agitation. Chasers and other additives could be added as necessary. T-butylhydroperoxide (t-BHP) and sodium formaldehyde sulfoxylate (SFS) chasers and ammonium hydroxide could be added to the latex for residual monomer reduction and pH control.

Example 2

To a 5-liter 4-necked round bottom glass reactor equipped with a mechanical stirrer, thermocouple, condenser, and nitrogen purge, 888.7 g of DI water and 4.60 g of hydroxyethyl cellulose (DOW Chemicals, WP-09H) were added and agitated for at least 20 minutes at 40° C.-50° C. to form a clear solution.

In a separate container, 6.6 g of methacrylic acid (MAA) monomer and 220.0 g of DI water were added, and pH of the mixture was adjusted to about 7.8 using 3.5 g of ammonium hydroxide (28%) solution. To this solution, 8.9 g of sodium dioctyl sulfosuccinate surfactant Aerosol OT (75% active of Cytec Industries) and 2.8 g of emulsifier, branched sodium dodecyl benzene sulfonate (e.g., Rhodacal DS-4, 23% active from Rhodia) were added and agitated thoroughly. This solution is warmed, if necessary, for complete dissolution.

The components in the following table were added into the above container and stirred for 20-30 minutes to form monomer pre-emulsion.

| | |
|---|---|
| Methyl methacrylate (MMA) | 458 g |
| Butyl acrylate (BA) | 442 g |
| N-(2-methacryloyloxyethyl)ethylene urea wet adhesion monomer | 43.8 g |

After about 25 minutes agitation to form a pre-emulsion, 58 g of this pre-emulsion was added to the reactor as seed monomer, together with 15 g of 12.6% potassium persulfate (KPS) initiator solution, to form the seed. The reactor temperature was maintained at 78° C. and stirring speed at 150-165 RPM for about 20 minutes. After the seed was formed, the monomer delay feed was commenced at a slow initial rate and the rate was increased after two hours. The feed rate and initiator concentration are controlled to avoid the gelling. For example, if the polymer conversion is too fast during the first hour, gelling is more likely to occur.

The following exemplary delay feed rates are preferred:

About 12.7% of total emulsified monomer mix during the first hour;

About 25.4% of total emulsified monomer mix during the second hour; and

About 61.9% of total emulsified monomer mix during the third hour.

The feeding of the emulsified monomers was completed in about 3 hours. The agitation of emulsified monomers was maintained at a slow speed during the monomer feed. 25 ml of 5.6% potassium persulfate (KPS) initiator solution was co-fed with the monomers.

The solid level at different time intervals was measured for control purposes. For example, if the solid level at 140 minutes is too high, indicating fast polymer conversion, for example above 28% solids, gelling is observed. An exemplary table showing preferred benchmark solid contents is as follows.

| | Stages | | | | |
|---|---|---|---|---|---|
| | Seed | Monomer feed stage | Monomer feed stage | Monomer feed stage | Monomer feed stage |
| Run time | 20 min. | 80 min. | 140 min. | 200 min. | 270 min. |
| Polymer solid % | 7.5% | 12% | 21% | 37% | 43% |

The batch was held at 82° C. for additional 60 minutes and then cooled down to 65° C. A small amount of t-butylhydroperoxide (t-BHP) and sodium sulfoxylate formaldehyde (SSF) chasers were added to the reactor for residual monomer reduction. The final latex pH value was brought to about 8.5 using appropriate ammonium hydroxide.

The HEC level was about 0.50% vs. total monomers. This latex sample had a minimum film forming temperature (MFFT) of about 14.4° C., average particle size (mV) of about 840 nm (bimodal particle size distribution), Brookfield viscosity ($\eta$) of about 498 cps.

Example 3

To a similar round bottom reactor as mentioned in example 2, 602.0 g of DI water and 2.0 g hydroxyethyl cellulose (WP-09H from Dow Chemicals) were added and HEC was completely dissolved by slow agitation.

In a separate container, 4.7 g of methacrylic acid (MAA) was added to 178 g DI water and 5.1 g of concentrated ammonium hydroxide solution (28%) was used to bring pH to about 8.4. To this mixture, 5.7 g sodium dioctyl sulfosuccinate surfactant Aerosol OT-75 and 2.0 g of (ranched sodium dodecyl benzene sulfonate emulsifier (e.g., Rhodacal DS-4 STD) were added and mixed well. The following monomers were added to this container to form monomer pre-emulsion through agitation:

| | |
|---|---|
| Methyl methacrylate (MMA) monomer | 329.0 g |
| Butyl acrylate (BA) monomer | 301.0 g |
| N-(2-methacryloyloxyethyl)ethylene urea wet adhesion monomer | 31.0 g |

About 41.0 g of this monomer pre-emulsion and about 10 g of 10.7% potassium persulfate (KPS) initiator solution were added into the reactor for seed formation. The reactor was preheated to 78° C. with $N_2$ sweep and with an agitation speed about 160 RPM.

In about 20 minutes, the emulsion seed was formed and emulsified monomer mixture was fed at the following feed rate:

About 2.5 ml/min. for one hour;

About 5.4 ml/min. for another hour; and

About 8.4 ml/min. for the rest of the monomers.

About 25 ml of 4.4% potassium persulfate (KPS) initiator solution was co-fed with the monomers feeding. The KPS solution was co-fed at about 0.083 ml/min during the first hour and about 0.17 ml/min during the rest of the monomer feed. The feeding of monomers was completed in about 3 hours and samples were taken in different time intervals for polymer conversion and particle size analysis. The reactor was held at about 80° C. for additional 40-60 minutes after the monomer pre-emulsion was completed and then cooled down to 65° C. The agitation of 160 RPM was maintained during the run.

Chasers (tBHP/SFS) and ammonia hydroxide solution were added to the latex sample to reduce the residual monomers and bring pH to about 8.0. The final average particle size (mV) and solids are about 960 nm and 44% respectively. HEC was 0.30% vs. total monomers.

Example 4

To the same reactor setup as described in Example 2, 445.0 g of deionized (DI) water and 2.0 g of emulsifier, branched sodium dodecyl benzene sulfonate (e.g., Rhodacal DS-4 std) were added and heated to 79° C. To an Erlenmeyer flask, the following ingredients were added and stirred to form a stable monomer pre-emulsion.

| | |
|---|---|
| Methyl methacrylate (MMA) monomer | 270.5 g |
| Butyl acrylate (BA) monomer | 310.9 g |
| Methacrylic acid (MAA) monomer | 4.7 g |
| Methacrylamide (MAM) monomer | 2.5 g |
| Diacetone acrylamide monomer (DAAM) | 2.9 g |
| Styrene monomer | 29.5 g |
| N-(2-methacryloyloxyethyl)ethylene urea wet adhesion monomer | 25.7 g |
| DI water | 210.0 g |
| Sodium dioctyl sulfosuccinate surfactant (Aerosol OT-75) (75% active) | 2.2 g |
| Tetrasodium N-(1,2-dicarboxyethyl)-N-octadecyl sulfosuccinamate surfactant (Aerosol A-22) (35% active) | 3.8 g |
| Ammonium salt of phosphate ester surfactant (100%) | 1.0 g |

Aerosol A22 is a surfactant made by Cytec Industries. About 1.9 g of ammonium hydroxide (28%) was also added to the monomer mix for pH adjustment.

About 10 ml of 12.8% potassium persulfate (KPS) initiator solution and 35.0 g of the monomer pre-emulsion were charged to the reactor at 79° C. to form seed particles. After about 20 minute at 79° C. with agitation, the delay feed of monomer pre-emulsion together with 30 ml of 4.2% KPS initiator solution was started. The delay feed rate for the reaction was as follows:

About 4.6 ml/min for the first hour; and
About 5.5 ml/min. for the remaining monomers.

In a separate container, 3.2 g of hydroxyethyl cellulose (HEC) and 88.0 g of DI water were mixed together. This HEC solution was mixed with about 15% of monomer pre-emulsion and fed gradually to the reactor for grafting reaction after polymerization conversion reached above 80%. Additional surfactants were also added into HEC solution at this stage.

| | |
|---|---|
| Branched alcohol ethoxy phosphate surfactant (25% active) | 6.0 g |
| Ammonium salt of phosphate ester surfactant (100% active) | 3.0 g |

When the monomer pre-emulsion was 80-85% fed, the leftover pre-emulsion (20%-15%) was mixed with the above ingredients and delay fed at about 5.5 ml/min to the reactor for grafting reaction.

About 15-30 minutes after the feed, the batch became viscous and then returned to workable viscosity again after holding at 82° C. for additional 30-60 minutes. The batch was cooled down to 65-68° C., and chasers and ammonium hydroxide were added with agitations. The properties of the produced latex were shown in the table below.

| Solids | pH | MFFT (° C.) | Particle size (mV) | Particle size (mV) | Mechanic Stability |
|---|---|---|---|---|---|
| After filtration | pH meter | Rhopoint WP | Before HEC | After HEC addition | 10,000 rpm |
| 43.0% | 8.0 | 12.8 | addition 145 nm | 543 nm | >30 min. |

This HEC grafted acrylic latex sample showed excellent water resistance and was water permeable. Water permeability results were shown in the table below. This property allows applications in areas outside the painting industry, e.g., material for contact lenses.

| Sample ID | Specific Permeability[3] mg/cm$^2$ · mm · 24 hr |
|---|---|
| Control latex without HEC[1] | 0.38 |
| HEC grafted Latex[2] | 1.01 |

[1]Control acrylic latex sample without any HEC during the reaction.
[2]HEC grafted acrylic latex sample from example 4. HEC is about 0.5% vs. total weight of monomers.
[3]The water vapor permeability for the grafted and control acrylic latex samples was measured by an internal method which followed the procedures given by the ASTM D1653-93 method (standard test methods for water vapor transmission of organic coating films). The test specimen was sealed to the open mouth of a cup or dish containing water, and the assembly was placed in a controlled atmosphere environment at constant humidity and temperature. The permeability cups used for the testing were BYK-Cardner PO-2301 (25 cm$^2$) and the parchment paper for vapor permeability test were from All-State International, Inc. The drawdown films were made on a parchment paper using the latex samples with a 3-mil drawdown bar and then the films were dried for one week before the water vapor permeability measurement. The dried film was cut into a proper size for the cup, the thickness of the film and paper was measured, and the weight of each coating sample was recorded. The permeability cup was filled with deionized water and the opening was sealed with the dry film. The samples were weighed to the 0.0001 g accuracy before and after 24 hours evaporation. The permeability was calculated using the formulations defined in section 13 of ASTM D1653-93 method.

Example 5A

To the same reactor setup as described in Example 2, 460 g of DI water and 0.65 of sodium bicarbonate were added. The reactor was heated to 78° C. and agitated at 160 RPM. The following ingredients were mixed to form monomer pre-emulsion.

| | |
|---|---|
| Methyl methacrylate (MMA) monomer | 290.0 g |
| Butyl acrylate (BA) monomer | 309.0 g |
| Methacrylic acid (MAA) monomer | 4.4 g |
| Methacrylamide (MAM) monomer | 2.6 g |
| Styrene monomer | 12.9 g |
| N-(2-methacryloyloxyethyl)ethylene urea wet adhesion monomer | 26.3 g |
| DI water | 226.0 g |
| Sodium dioctyl sulfosuccinate surfactant (Aerosol OT-75) | 6.0 g |
| Blend of anionic and nonionic surfactants | 3.0 g |

A suitable example of the blend of anionic and nonionic surfactants is Cytec XSM 1110 (50% active). After the monomer pre-emulsion formed, 2.9 g of ammonium hydroxide (28%) was added to the monomer emulsion for a pH of 6.2.

About 41.0 g of this monomer emulsion and about 10 ml of 12.6% potassium persulfate (KPS) initiator solution were charged into the reactor for seed. After 20 minutes of heating at 79° C., seed particles formed, and the monomer pre-emulsion was fed into the reactor at the following rate:

About 4.6 ml/min. for the first hour; and
About 5.5 ml/min for the rest of the monomer emulsion.
About 25 ml of 4% KPS initiator in DI water was also co-fed with the monomer emulsion.

When about 8-10% of total monomer pre-emulsion was remaining, 83 g of 3.9% HEC solution in DI water together with 5.2 g of Rhodafac RS610/A25 and 5.5 g of Aerosol 22 surfactants were added to the 8-10% remaining monomer emulsion to complete the delay feed in 40-60 minutes. The totals were fed completely in about 3 hours and latex was held at about 82° C. for additional 50-60 minutes and then cooled down to 65° C. Chasers and ammonium hydroxide were added. The properties of the produced latex were shown in the table below.

| Solids | MFFT (° C.) | pH | Particles size (mV) Before HEC grafting | Particle size (mV) After HEC grafting |
|---|---|---|---|---|
| 43% | 13 | 8.0 | 191 nm | 239 nm |

The paint sample made with this latex showed water sensitivity due to the absence of the monomer combination methacrylamide/acryamide/styrene. The grafting was not as effective as in examples 4 and 6 due to insufficient monomer emulsion (about 8%) when HEC was added. The final average particle size (mV) after HEC grafting reaction was smaller than that of the typical HEC grafted samples which ranges from about 300 nm to about 900 nm.

Example 5B

To the same reactor setup as described in Example 2, 534 g of DI water was added. The reactor was heated to 79° C. and agitated at 180 RPM. To a 2 liter Erlenmeyer flask, the following ingredients were mixed together and agitated for at least 20 minutes to form stable monomer pre-emulsion.

| | |
|---|---|
| Methyl methacrylate (MMA) monomer | 300.6 g |
| Butyl acrylate (BA) monomer | 374.4 g |
| Methacrylic acid (MAA) monomer | 6.2 g |
| Diacetone acrylamide (DAAM) | 3.4 g |
| Styrene monomer | 40.0 g |
| N-(2-methacryloyloxyethyl)ethylene urea wet adhesion monomer (50%) | 17.5 g |
| 2 Ethylhexyl acrylate (2-EHA) | 23.2 g |
| DI water | 264.0 g |
| Sodium dioctyl sulfosuccinate surfactant (Aerosol OT-75) | 2.6 g |
| Tetrasodium N-(1,2-dicarboxyethyl)-N-octadecyl sulfosuccinamate surfactant (Aerosol A-22) (35% active) | 4.6 g |
| Stepan Polystep TSP-16PE (20%) | 8.4 g |

After the monomer pre-emulsion formed, 1.7 g of ammonium hydroxide (28%) was added to the monomer emulsion for a pH of 6.5.

About 50.4 g of this monomer emulsion and about 15 ml of 10.6% potassium persulfate (KPS) initiator solution were charged into the reactor for seed. After 20 minutes of heating at 79° C., seed particles formed, and the monomer pre-emulsion was delay fed into the reactor at the following rate:

About 6.5 ml/min for the first hour; and
About 7.4 ml/min. for the rest of the monomer emulsion.
About 68 ml of 2.4% KPS initiator in DI water was also co-fed with the monomer emulsion.

When about 10-14% of total monomer pre-emulsion was remaining, 99 g of 3.9% HEC solution in DI water together with 7.8 g of Rhodafac RS610/A25 and 20.4 g of Polystep TSP-16PE (neutralized at 20%) were added into the remaining monomer pre-emulsion and delay fed into the reactor together with KPS solution. The latex became very viscous near the end of the HEC feed but the viscosity would eventually drop after one hour holding. The agitation RPM should be raised to ensure proper mixing. The total feed time for monomers was about 3 hours and the batch was then held at about 82° C. for additional 60 minutes or longer. After the hold, the batch was cooled down to 65° C. and the chasers and ammonium hydroxide were added for residual monomer and pH controls. The properties of the produced latex are in the table below.

| Solids | MFFT (° C.) | pH | Particles size (mV) Before HEC grafting | η (cP) | Particle size (mV) After HEC grafting |
|---|---|---|---|---|---|
| 41.2% | 6.0 | 8.8 | 177 nm | 410 | 639 nm |

Example 6

HEC Added with 31% Monomer Pre-Emulsion

To the same reactor setup as described in Example 2, 425.0 g of deionized (DI) water was added and heated to 79° C. To an Erlenmeyer flask, the following ingredients were added and stirred to form a stable monomer pre-emulsion.

| | |
|---|---|
| Methyl methacrylate (MMA) monomer | 259.3 g |
| Butyl acrylate (BA) monomer | 322.5 g |
| Methacrylic acid (MAA) monomer | 5.2 g |
| Methacrylamide (MAM) monomer | 2.5 g |
| Diacetone acrylamide (DAAM) monomer | 2.9 g |
| Styrene monomer | 29.8 g |
| N-(2-methacryloyloxyethyl)ethylene urea wet adhesion monomer | 25.9 g |
| DI water | 210.0 g |
| Sodium dioctyl sulfosuccinate surfactant (Aerosol OT-75) (75% active) | 2.1 g |
| Tetrasodium N-(1,2-dicarboxyethyl)-N-octadecyl sulfosuccinamate surfactant (Aerosol A-22) (35%) | 5.2 g |
| Ammonium salt of phosphate ester surfactant (100%) | 0.6 g |

About 1.8 g of ammonium hydroxide (28%) was also added for pH adjustment.

About 15 ml of 8.6% potassium persulfate (KPS) initiator solution and about 40.0 g of the monomer pre-emulsion were charged to the reactor at 79° C. to form seed particles. After about 20 minute at 79° C. with agitation, the delay feed of monomer pre-emulsion, together with 30 ml of 4.1% KPS initiator solution was started. The delay feed rate for the reaction was as follows:

About 4.6 ml/min for the first hour; and
About 5.5 ml/min for the remaining monomers.

In a separate container, 3.2 g of hydroxyethyl cellulose (EEC) and 91.0 g of DI water were mixed together. This HEC solution (3.5%) and additional surfactants were mixed with 31% of monomer pre-emulsion and fed gradually to the reactor for grafting reaction after polymerization conversion reached above 68%. When the monomer pre-emulsion was 80-85% fed, the remaining pre-emulsion (20%-15%) was mixed with the following ingredients and was delay feed at about 5.5 ml/min to the reactor for grafting reaction.

| | |
|---|---|
| Branched alcohol ethoxy phosphate surfactant (25% active) | 6.0 g |
| Ammonium salt of phosphate ester surfactant (100% active) | 3.4 g |

About 20 minutes after all the ingredients were fed, the latex became viscous, and then reduced to normal viscosity after 45-60 minutes holding at 82° C. The batch was cooled down to 66° C., and chasers (t-BHP and SFS) and ammonium hydroxide were added. The properties of the produced latex were shown in the table below.

| Solids | pH | MFFT (° C.) | Particle size (mV) | Particle size (mV) | Mechanic Stability |
|---|---|---|---|---|---|
| After filtration 43.6% | pH meter 8.0 | Rhopoint WP 10.1 | Before HEC addition 162 nm | After HEC addition 548 nm | 10,000 rpm >30 min. |

The particle size distribution of this batch showed bimodal for the sample taken at 45 minutes hold, and uni-modal distribution after 100 minutes hold. The paint showed good water and scrub resistances, with no syneresis and color float and good flow and leveling results.

Example 7

Comparative Example U.S. Pat. No. 6,596,804B1

To a 5-liter 4-necked round bottom glass reactor equipped with a mechanical stirrer, heating/thermocouple, condenser, and nitrogen purge, 876 grams of HEC-free acrylic emulsion polymer latex made with a similar procedure as disclosed in the previous examples (Examples 4-6, no HEC was added) with following composition was added (percentage is the weight of each component vs. the total weight of the latex added in this step):

| Methyl methacrylate (MMA) monomer | 26.3% |
|---|---|
| Butyl acrylate (BA) monomer | 23.3% |
| Methacrylic acid (MAA) monomer | 0.3% |
| N-(2-methacryloyloxyethyl)ethylene urea wet adhesion monomer | 1.1% |
| Combination of anionic surfactants: Branched alcohol ethoxy phosphate | 0.34% |
| Sodium $C_{14}$-$C_{16}$ Olefin sulfonate | 0.19% (1.06% vs. monomers) |
| DI Water | 48.47% |

The above polymer latex was heated to 66° C. with agitation, and then 25.0 g of monomers, 97.7 g of 3.9% HEC (WP-09H) solution, and redox initiators were added to the polymer emulsion over 15 minutes. The compositions are shown below:

| Monomers: | 25 g total |
|---|---|
| BA | 14.5 g |
| MMA | 11.0 g |
| MAA | 0.5 g |
| HEC solution 3.9% | |
| Pre-dissolved HEC | |
| HEC (WP-09H) | 3.8 g (0.86% vs. total monomers added in this and previous steps) |
| DI water | 93.9 g |
| Redox initiators: | |
| Ammonium persulfate (APS) in DI water | 0.85 g/20 ml |
| SFS (sodium formaldehyde sulfoxylate) in DI water | 0.65 g/20 ml |

After the feed, the reaction mixture was held at 64° C. for additional 20 minutes for "end of treat hold" taught by U.S. Pat. No. 6,596,804B1.

The solution of APS and SFS initiators were added separately into reactor dropwise over 18 min. At the end of the hold, additional chasers (t-BHP/SFS, ammonium hydroxide (28%)) were added into the emulsion latex.

The final latex had the following results:

| Solids After HEC | Particle size (mV) After HEC addition | Particle size (mV) Before HEC addition | pH End of run |
|---|---|---|---|
| 46.2% | 156 nm | 153 nm | 8.0 |

This latex sample was lumpy and showed severe syneresis/settling after two weeks and was not usable in paint formulations. The latex sample was not stable enough to test on a rotational viscometer for rheological curves. The average particle size after HEC addition also indicated that there was no effective grafting with this post treatment procedure.

Example 8

To the same reactor setup as described in Example 2, 420 g of DI water was added with nitrogen sweep and agitation at 170 RPM. The following ingredients were mixed to form a monomer pre-emulsion.

| Methyl methacrylate (MMA) monomer | 265.3 g |
|---|---|
| Butyl acrylate (BA) monomer | 306.6 g |
| Methacrylic acid (MAA) monomer | 5.4 g |
| Methacrylamide (MAM) monomer | 2.6 g |
| Diacetoneacrylamide (DAAM) monomer | 2.9 g |
| 2-ethylhexylacrylate (2-EHA) monomer | 25.6 g |
| N-(2-methacryloyloxyethyl)ethylene urea wet adhesion monomer | 25.6 g |
| N Methylol methacrylamide monomer (Visiomer NMMAA) | 7.4 g |
| DI water | 220.0 g |
| Sodium dioctyl sulfosuccinate surfactant (Aerosol OT-75) | 2.3 g |
| Tetrasodium N-(1,2-dicarboxyethyl)-N-octadecyl sulfosuccinamate surfactant (Aerosol A-22) (50%) | 5.4 g |

After the monomer pre-emulsion is formed, about 1.5 g of ammonium hydroxide (28%) was added to the monomer emulsion for pH adjustment.

About 41.0 g of this monomer pre-emulsion and about 10 ml of 12.6% potassium persulfate (KPS) initiator solution were charged into the reactor forming seed particles. After 20 minutes heating at 79° C., the monomer pre-emulsion was delay fed into the reactor at the following rate:

About 4.6 ml/min. for the first hour; and
About 5.5 ml/min. for the rest of the monomer emulsion.

About 30 ml of 4.1% potassium persulfate (KPS) initiator in DI water was also co-fed with the monomer pre-emulsion.

When about 3% of total monomer pre-emulsion was remaining, 94.0 g of 3.9% pre-dissolved HEC water solution, together with 6.0 g of Rhodafac RS610/A25 and 3.3 g of ammonium salt of phosphate ester (100%) surfactants were added to the 3% remaining monomer emulsion to complete the delay feed in about 50 minutes. The batch was held at 82° C. for additional 50-60 minutes and then cooled down to 65° C. Chasers and ammonium hydroxide were added. The properties of the produced latex were shown in the table below.

| Solids | MFFT (° C.) | pH | Particles size (mV) Before HEC grafting | Particle size (mV) After HEC grafting |
|---|---|---|---|---|
| 43.2% | 6.8 | 8.0 | 198 nm | 235 nm |

Example 9

To the same reactor setup as described in Example 2, 435 g of DI water was added with nitrogen sweep and agitation at 170 RPM. The following ingredients were mixed to form a monomer pre-emulsion.

| | |
|---|---|
| Methyl methacrylate (MMA) monomer | 278.7 g |
| Butyl acrylate (BA) monomer | 252.7 g |
| Methacrylic acid (MAA) monomer | 5.3 g |
| Methacrylamide (MAM) monomer | 5.2 g |
| Diacetoneacrylamide (DAAM) monomer | 2.6 g |
| 2-ethylhexylacrylate (2-EHA) monomer | 84.3 g |
| N-(2-methacryloyloxyethyl)ethylene urea wet adhesion monomer (Rohamere 6852-O) | 11.7 g |
| N-Methylol methacrylamide monomer (Visiomer NMMAA) | 7.8 g |
| DI water | 220.0 g |
| Sodium dioctyl sulfosuccinate surfactant (Aerosol OT-75) | 2.0 g |
| Tetrasodium N-(1,2-dicarboxyethyl)-N-octadecyl sulfosuccinamate surfactant (Aerosol A-22) (50%) | 5.2 g |
| Ammonium salt of phosphate ester surfactant | 0.4 g |

After the monomer pre-emulsion is formed, about 1.8 g of ammonium hydroxide (28%) was added to the monomers for pH adjustment.

About 40.0 g of above monomer pre-emulsion and 10 ml of 13.0% potassium persulfate (KPS) initiator solution were charged into the reactor for seed particles. After 20 minutes heating at 79° C., and the monomer pre-emulsion was delay fed into the reactor at the following rate:

About 4.6 ml/min for the first hour; and

About 5.5 ml/min for the rest of the monomer emulsion. About 30 ml of 4.1% potassium persulfate (KPS) in DI water was also co-fed with the monomer pre-emulsion.

When about 36% of total monomer pre-emulsion remained, 94.0 g g of 3.9% pre-dissolved HEC water solution, together with 6.0 g of Rhodafac RS610/A25 and 3.3 g of ammonium salt of phosphate ester (100%) surfactants were added to the 36% remaining monomer emulsion to complete the delay feed in about 40 minutes. The batch was held at 82° C. for additional 60 minutes and then cooled down to 65° C. Chasers and ammonium hydroxide were added. The properties of the produced latex were shown in the table below.

| Solids | MFFT (° C.) | pH | Particles size (mV) Before HEC grafting | Particle size (mV) After HEC grafting |
|---|---|---|---|---|
| 42.4% | 4.3 | 8.0 | 170 nm | 255 nm |

The final average particle was smaller when using 2-ethylhexylacrylate (2-EHA) monomer and N-methylol methacrylamide monomer (Visiomer NMMAA) in the acrylic composition, even when HEC was mixed with higher concentration of monomer pre-emulsion. However, when 2-EHA was used in the acrylic monomer compositions, the particle size distribution of the grafting reaction did not go through a bimodal distribution stage, indicating more resistance to coagulation/gelling. The samples taken at different holding time after the HEC addition all showed unimodal particle distributions.

Paint Examples:

Example 10

Control Sample

The paint sample was prepared using the same procedure as in Example 12. The latex sample used for paint formulation did not contain grafted HEC. 0.3% HEC (v.s. latex polymer solids) was post blended in the paint formulation through mixing. The rheological curve of this sample was shown in FIG. 1.

Example 11

Control Sample

The paint sample was prepared using the same procedure as in Example 12. The latex sample used for paint formulation did not contain grafted HEC. 0.5% HEC (v.s. latex polymer solids) was post blended in the paint formulation through mixing. The rheological curve of this sample was shown in FIG. 1.

Example 12

Control Example

Preparation of a paint using acrylic latex which does not contain any HEC (control sample). The amounts are given in grams.

| Grind | |
|---|---|
| Water | 96.2 |
| Hydrophobically modified HEC (Natrosol Plus 330) | 0.5 |
| Preservatives | 1.9 |
| Zinc Pyrithione antimicrobial (ZINC OMADINE) | 1.0 |
| 3-iodo-2-propynyl butylcarbamate antimicrobial (Fungitrol 940) | 0.5 |
| Maleic anhydride copolymer pigment dispersant (Tamol 731A) | 6.7 |
| Polysiloxane defomer (Byk-023) | 1.0 |
| TiO$_2$ pigment (Tronox CR-826) | 40.4 |
| Hydrous aluminosilicate extender (ASP 170) | 62.5 |

| Letdown | |
|---|---|
| Potassium carbonate | 1.2 |
| Water | 9.6 |
| Ethoxylated tetramethyldecynediol surfactant (Surfynol 440) | 3.8 |
| Paraffinic Oil defoamer (Hi Mar DFC-38) | 0.7 |
| Coalescent (Optifilm Enhancer 400) | 9.6 |
| Water | 1.9 |
| 80335 latex | 96.2 |
| 80342 latex | 375.1 |
| Polysiloxane defomer (Byk-023) | 1.9 |
| Paraffinic Oil defoamer (Hi mar DFC-38) | 1.2 |
| Hydrophobically modified polyether rheology modifier (Aquaflow NHS-300) | 24.0 |
| Water | 102 |
| Nonionic urethane rheology modifier (Acrysol RM-8W) | 15 |
| Ethoxylated acetylenic diol surfactant (Surfynol 465) | 1.4 |
| Propylene glycol | 11.5 |
| Modified paraffin wax emulsion (Aquacer 539) | 9.6 |
| Acrylic polymer open time extender (Wonderwet IV) | 9.6 |
| Nonionic associative rheology modifier (Aquaflow XLS-525) | 2.9 |
| Water | 10.5 |

80335 latex and 80342 latex are in house acrylic latexes without HEC. 80335 latex is all acrylic with 46% solids. 80342 latex is all acrylic with 51% solids. The paint had an overnight viscosity of 103 KU and 0.925 ICI. About 680 g of paint was shot with 47 shots of red oxide colorant to yield a tinted paint with a viscosity of 100 KU and 0.792 ICI. One shot is ¹⁄₃₂ liquid ounce. The tinted paint had the following properties: 14 sag, 7.6 Leneta flow and leveling based on a laser measurement, gloss/sheen of 54.1/81.1, scrub of 750, and water resistance of 2 (1-4 scale with 4 being the best). After one week, the paint exhibited synersis and color float.

Example 13

Preparation of paint using acrylic latex modified with 0.3% HEC from Example 3.

| Grind | |
|---|---|
| Water | 96.2 |
| Hydrophobically modified HEC (Natrosol Plus 330) | 0.5 |
| Preservatives | 1.9 |
| Zinc Pyrithione antimicrobial (ZINC OMADINE) | 1.0 |
| 3-iodo-2-propynyl butylcarbamate antimicrobial (Fungitrol 940) | 0.5 |
| Maleic anhydride copolymer pigment dispersant (Tamol 731A) | 6.7 |
| Polysiloxane deformer (Byk-023) | 1.0 |
| TiO$_2$ pigment (Tronox CR-826) | 40.4 |
| Hydrous aluminosilicate extender (ASP 170) | 62.5 |

| Letdown | |
|---|---|
| Potassium Carbonate | 1.2 |
| Ethoxylated tetramethyldecynediol surfactant (Surfynol 440) | 3.8 |
| Paraffinic Oil defoamer (Hi Mar DFC-38) | 0.7 |
| Coalescent (Optifilm Enhancer 400) | 11 |
| 80335 latex | 96.2 |
| Latex from Example 3 (0.3% HEC-grafting) | 439 |
| Polysiloxane deformer (Byk-023) | 1.9 |
| Paraffinic Oil defoamer (Hi Mar DFC-38) | 1.2 |
| Hydrophobically modified polyether rheology modifier (Aquaflow NHS-300) | 30 |
| Nonionic urethane rheology modifier (Acrysol RM-8W) | 15 |
| Nonionic low foam surfactant (Surfynol 465) | 1.4 |
| Propylene glycol | 11.5 |
| Modified paraffin wax (Aquacer 539) | 9.6 |
| Acrylic polymer open time extender (Wonderwet IV) | 9.6 |
| Rheology modifier (Aquaflow XLS-525) | 2.9 |
| Water | 60 |

The paint had an overnight viscosity of 103 KU and 0.979 ICI. 680 g of paint was shot with 47 shots of R3 colorant to yield a tinted paint with a viscosity of 99 KU and 1.029 ICI. One shot is 1/32 liquid ounce. The tinted paint had the following properties: 18 sag, 7.6 Leneta flow and leveling, gloss/sheen of 52.4/78.7, scrub of 500 (normalized), and water resistance of 2 (1-4 scale with 4 being the best). After one week, the paint exhibited no syneresis and no color float.

Example 14

Preparation of paint using acrylic latex modified with 0.5% HEC from Example 2.

| Grind | |
|---|---|
| Water | 96.2 |
| Hydrophobically modified HEC (Natrosol Plus 330) | 0.5 |
| Biocides preservatives (Nuosept 98) | 1.9 |
| Zinc Pyrithione antimicrobial (ZINC OMADINE) | 1.0 |
| 3-iodo-2-propynyl butylcarbamate antimicrobial (Fungitrol 940) | 0.5 |
| Maleic anhydride copolymer scale inhibitor (Tamol 731A) | 6.7 |
| Polysiloxane deformer (Byk-023) | 1.0 |
| TiO$_2$ pigment (Tronox CR-826) | 40.4 |
| Hydrous aluminosilicate extender (ASP 170) | 62.5 |

| Letdown | |
|---|---|
| Potassium Carbonate | 1.2 |
| Ethoxylated tetramethyldecynediol surfactant (Surfynol 440) | 3.8 |
| Paraffinic Oil defoamer (Hi Mar DFC-38) | 0.7 |
| Coalescent (Optifilm Enhancer 400) | 11 |
| 80335 latex | 96.2 |
| Latex from Example 2 (0.3% HEC-grafting) | 433 |
| Polysiloxane deformer (Byk-023) | 1.9 |
| Paraffinic Oil defoamer (Hi Mar DFC-38) | 1.2 |
| Hydrophobically modified polyether rheology modifier (Aquaflow NHS-300) | 26 |
| Nonionic urethane rheology modifier (Acrysol RM-8W) | 16 |
| Nonionic low foam surfactant (Surfynol 465) | 1.4 |
| Propylene glycol | 11.5 |
| Modified paraffin wax (Aquacer 539) | 9.6 |
| Acrylic polymer open time extender (Wonderwet IV) | 9.6 |
| Nonionic associative rheology modifier (Aquaflow XLS-525) | 2.9 |
| Water | 66.5 |

The paint had an overnight viscosity of 100 KU and 0.967 ICI. 680 g of paint was shot with 47 shots of R3 colorant to yield a tinted paint with a viscosity of 95 KU and 0.812 ICI. The tinted paint had the following properties: 18 sag, 8.1 Leneta flow and leveling, gloss/sheen of 52.6/82.2, scrub of 600 (normalized), and water resistance of 2 (1-4 scale with 4 being the best). After one week, the paint exhibited no syneresis and no color float.

Summary of Examples 11-14

HEC modification leads to paints with higher sag values and comparable flow and leveling. Also, no syneresis and no color float are exhibited by paints employing the HEC modified latexes as shown in Examples 13 and 14, while the paints in Examples 10 and 11 employing latex from Example 12 with HEC but with no grafting exhibit color float and syneresis. The comparative latex in Example 7 has too much gelling and is not stable enough to be used in paint formulations.

FIG. 1 shows the rheological curves of paints produced in Examples 11-14. Examples 13-14 are inventive and Examples 11-12 are comparative controls. The rheological curve of Example 10 is not shown. The viscosities (yield) of the samples (vertical axis) were measured at different sheer rate (spin speed) (horizontal axis). Low spin speed mimics the stage when the paint is at substantially static conditions. At this stage, high viscosity is desirable indicating low color flow and low color separation. High spin speed mimics the stage when a user is applying the paint onto a surface. At this stage, low viscosity is desirable indicating easier application.

The rheological curves of Example 11 (curve C in FIG. 1) and Example 12 (curve D in FIG. 1) show low yield (low viscosity) at low sheer rate (low spin speed). However, the two paint formulations described in Example 13 (curve B in FIG. 1) and Example 14 (curve A in FIG. 1), which were prepared using HEC grafted latex, clearly show significantly higher viscosity values at low spin speed than curves of Examples 11 and 12 at Ai and Bi, with the curve of Example 14 having a higher viscosity than that of Example 13. This indicates that paints in Examples 13 and 14 are more resistant to low sheer and have less flow and leveling. As the spin speed increases, the viscosities of Examples 13 and 14 decrease indicating they are easy to work with when applied onto surfaces, similar to curves C and D.

In addition, the grafted samples show different viscosity properties at lower sheer rates (less than approximately around $°\gamma \sim 10$ 1/s). For the samples made with non-HEC-grafted latex in Examples 11 and 12, the viscosity has a linear relationship v.s. the sheer rate (spin speed). However, for the HEC grafted samples in Examples 13 and 14, the viscosities go through a second order transition at low sheer rates. When the sheer rate is small (less than approximately around $°\gamma \sim 0.1$ 1/s), viscosities actually increase for paints in Examples 13 and 14 as shown in curves Ai and Bi in FIG. 1. This has not been reported in prior art and is a unique property of the highly HEC-grafted paints.

Example 15

Measurement of Open Time

The open time measurement was performed as follows. A timer was started at time=zero seconds. A one mil thick drawdown of paint was prepared on a sealed white Leneta card. The card was tacked to a wall, and lines were drawn vertically with a comb. The timer was restarted at the 25 second mark, and paint was brushed once across the drawdown with a 1.5 inch brush every 30 seconds. The point where all of the comb lines were visible was noted, and the open time was 30 seconds before that point.

| Paint | Open time |
| --- | --- |
| Example 12 | 1.5 minutes |
| Example 13 | 2.0 minutes |
| Example 14 | 2.5 minutes |

HEC grafted acrylic latex shows an improvement in open time.

Example 16

Paint Out

The paints of Examples 12, 13 and 14 were painted onto unprimed door skins, and observations were recorded with respect to application. Once the paints had dried, the painted skins were rated for flow and leveling.
  Paint of example 12: The paint was workable, but was not preferred.
  Paint of Example 13: Looser than Example 12. Easier to work with than Example 12. No drag detected.
  Paint of Example 14: Slightly more drag than Example 13, but this paint was preferred over the other two.
In terms of application, Example 14 was preferred over Example 13, and Example 12 was preferred the least as it needed a lot of work to paint with.

When the paints had dried, Examples 13 and 14 looked about the same, and both looked better than Example 12. In other embodiments, other methods of making the inventive composition can be utilized.

Example 17

Two-step polymerizations can be used to increase the polymer solids and control the particle size distributions without gelling or coagulation. HEC was added in the water phase before adding the seed monomer emulsion as disclosed in the previous examples. The first portion of polymer conversion was controlled to be less than 30% solids, preferably 10%-30% solids, and the particle size distribution was monitored to make sure it was uni-modal distribution. The batch was cooled down to 65° C. and chasers were added to reduce residual monomers. The batch was neutralized with NaOH or ammonia hydroxide until pH was in the range of about 8.0 to about 8.8.

About 8.0 g of sodium lauryl sulfate surfactant and about 8.0 g of polymeric surfactant (polyoxyethylene-polyoxypropylene block co-polymer) were added to the remaining (second portion) monomer emulsion and the mixture was agitated for 20-30 minutes. The temperature of the reactor containing HEC grafted acrylic polymer (about 30% solids) was raised to 78° C. About 0.6 g potassium persulfate (KPS) initiator was added to 35 g of this monomer emulsion as seed. After about 15 minutes when temperature levels off, the monomer feed was added together with the KPS initiator solution. The reactor temperature was held at 79° C. for 40 more minutes after monomer feed was completes. The chasers, tBHP and SFS, were added to the reactor at the end. The pH of the latex was adjusted to about 8.5 using ammonia hydroxide or NaOH if needed.

The particle size distribution was uni-modal and solids level was about 45%. The final emulsion latex properties were:
  Particle size: 450 nm
  Polymer solids: 43.0%
  Minimum film formation temperature: 14.3° C.
  Viscosity ($\eta$): 170 cPs
  pH: 8.1
  Gels: 30 ppm Another aspect of the present invention is directed to novel crosslinking of the latex particles at ambient conditions. In waterborne systems, crosslinking of the latex particles when applied on to a substrate and dried is desirable because the crosslinking improves the dried film strengths. However, latex particles should remain relatively free of crosslinking while in the aqueous dispersion phase for improve storage and shelf life, but should undergo extensive crosslinking once applied to a substrate. Without being bound to any particular theory, molecular inter-diffusion between neighboring latex particles, which is important for the generation of latex film strength, should take place prior to the crosslinking reaction. Strongly crosslinked particles are unable to interdiffuse.

The conventional approach of using diacetone acrylamide (DAAM) and adipic acid dihydrazide (ADH) sometimes allows crosslinking reactions between the DAAM and ADH during storage, i.e., while the latex particles are in the aqueous phase. This is undesirable because it causes adverse shelf stability issues and possible loss of self-crosslinking ability at ambient conditions. Other conventional two-component crosslinking approaches have similar stability issues and VOC and odor concerns.

In some of the above examples, surprisingly when methacrylamide (MAM) and acrylamide, such as diacetone acrylamide (DAAM), with or without styrene, are used they act as self-crosslinking agents at ambient conditions, while not crosslinking in the aqueous phase, when the latex compositions are applied on a substrate or surface without using heat or dryers. Without being bound to any particular theory, the present inventors believe that the self-crosslinking occurs through particle-to-particle or inter-polymer chain interactions of the functional groups, e.g., methacrylamide and diacetone acrylamide, incorporated onto the polymer chains. Again without being bound to any particular theory, it is believed that the two primary hydrogens on the methacrylamide may be involved with the carboxylic or other active site(s) of the diacetone acrylamide and reacted through an imine linkage. Hydrogen bonding and chain entanglement are also likely to have occurred, which would further enhance the film mechanical strength.

The crosslinking is confirmed by measuring water sensitivity on the dried film. The basic principle of the water sensitivity test is to place a few drops of deionized water on the pre-dried film and wait for 5 minutes or longer and then perform the rating using finger nail scratching or other hard object on the wetted spots. The resistance to the scratching is rated from 1-5 in this particular experiment, with 5 being the best. The film was dried at ambient conditions before performing the water sensitivity test, as shown. below, Water sensitivity test was performed for Examples 4, 5A, and 5B discussed above. The compositions in all three examples contain styrene. Example 4 contains both DAAM and methacrylamide; example 5A contains DAAM but not methacrylamide; and example 5B contains methaerylamide but not DAAM.

| Film Drying time | 4 hrs. | 5 hrs. | 6.5 hours | 24 hrs. | 7 days |
|---|---|---|---|---|---|
| Water wetting time | 5 min | 5/10 min. | 5/10/25 min. | 10 min. | 25 min. |
| Water sensitivity (1-5) Example 4 DAAM/MAM combo | 4+ | 5/4− | 5+/5/4 | Not scratchable 5+ | Not scratchable 5+ |
| Water sensitivity (1-5) Example 5B without MAM | 1− | 1/1− | 1+/1/0-1 | Poor film strength 2 | scratchable 3 |
| Water sensitivity (1-5) Example 5A Without DAAM | 0 | Not available | Not available | Poor film strength 1+ | Poor water sensitivity 2 |

This water sensitivity test shows significantly better crosslinking when DAAM is used with methacrylamide in Example 4 even when no heat or dryer is used. When one of these two components omitted as in examples 5A and 5B, the dried latex is very sensitive to water, which means that the crosslinking is low or poor.

The self-crosslinking in ambient conditions when the latex is coated on a substrate using the DAAM/methacrylamide does not require any dryer, or a second component to initiate the crosslinking. This novel combination. also minimizes the volatile organic compounds (VOC) or odor issues associated with conventional two-component approaches, such as DAAM and adipic acid dihydrazide (ADH), improves the film mechanical strength, and extends the storage life of the latex in the aqueous phase. Preferably, the latex composition is substantially free of adipic acid dihydrazide or the like. The water molecules appeared. to play a significant role for latex stability. When water is present, the premature crosslinking reactions are significantly restricted, because particle-particle inter-diffusions or inter-chain interactions are hindered. The latex sample disclosed in Example 4 remains stable even after one year storage and the dry film formed from this latex still exhibits excellent water sensitivity and crosslink ability.

Without being bound to any particular theory, the present inventors believe that in a conventional two component cross-linking system, such as DAAM and ADH, the hydrazide in ADH is water soluble and can conduct or travel through water in the aqueous latex compositions or paints. The hydrazide particles can react with the DAAM while the latex compositions or paints are in storage and can cause premature cross-linking. On the other hand, in the inventive DAAM and MAM cross-linking system, both the DAAM and MAM are adhered or otherwise attached to the latex particles and water acts to separate the latex particles away from each other thereby inhibiting cross-linking while being dispersed in water.

This approach can be tailored to use different functional groups for many other applications. Although there may be some limited intra-particie/intra-chain crosslinking, the present inventors believe that the majority of the crosslinking reactions occur when the latex particles interdiffused in contact with neighboring particles during the drying and coalescence process. This conclusion is based on the observations that the latex sample of Example 4 stored for one year still maintains its crosslink ability, when this latex is coated on a substrate at ambient conditions.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An aqueous latex composition comprising hydroxyethyl cellulose (HEC) grafted acrylic polymer emulsions,
   wherein the latex composition comprises at least about 0.2% of HEC by weight relative to the monomer weight,
   wherein latex composition contains at least about 45% solid, and
   wherein the average mean volume (mV) latex particle size is in the range of about 320-about 850 nm.

2. The aqueous latex composition of claim 1, wherein the polymer comprises acrylic monomers, styrene monomers, and methacrylamide monomers.

3. The aqueous latex composition of claim 2, wherein the acrylic monomers comprise at least acrylamide monomers.

4. The aqueous latex composition of claim 3, wherein the acrylamide monomers comprise at least diacetoneacrylamide monomers.

5. The aqueous latex composition of claim 4, wherein the weight concentration of methacrylamide is about 0.1-about 1.0%, diacetoneacrylamide is about 0.1-about 1.0%, and styrene is about 1.0-about 10.0%.

6. The aqueous latex composition of claim 1, wherein the acrylic monomers comprise at least methylolmethacrylamide monomers.

7. The aqueous latex composition of claim 1, wherein the polymer comprised at least acrylic monomers with amide and aromatic function groups.

8. The aqueous latex composition of claim 1, wherein the average mean volume (mV) particle size of acrylic core is between about 150 nm and about 280 nm.

9. The aqueous latex composition of claim 1, wherein the latex has high viscosities at substantially static conditions.

10. The aqueous latex composition of claim 1, wherein the latex is water resistant and has specific permeability higher than 0.5 mg/cm$^2$.mm.24 hrs.

11. The aqueous latex composition of claim 1, wherein the latex contains less than about 700 ppm of gels.

12. An emulsion polymerization method to graft hydroxyethyl cellulose (HEC) to acrylic polymer to produce the HEC grafted acrylic polymer of claim 1 comprising the steps of
providing and neutralizing acrylic monomers in an emulsion container to form a monomer pre-emulsion;
polymerizing the acrylic monomers at a first feeding rate;
controlling the first feeding speed so that an average size (mV) of an acrylic core is above about 160 nm;
adding the HEC to water to form an HEC solution;
mixing about 10% to about 40% of the monomer pre-emulsion with the HEC solution after the acrylic polymer conversion reaches about 90% to about 60%;
feeding the HEC/monomer mixture to the reactor at a second feeding rate;
wherein the average particle size (mV) of acrylic core is controlled between about 160 nm and about 280 nm at the end of about 90% to about 60% acrylic polymer conversion before the HEC solution is added; and
wherein the HEC-grafted acrylic polymer contains less than about 700 ppm of gels.

13. The method of claim 12, wherein surfactants are added along with the HEC solution.

14. The method of claim 13, wherein surfactants comprise a combination of anionic sulfosuccinate, anionic sulfosuccinamates, branched alcohol ethoxy phosphate, and an ammonium salt of phosphate ester.

15. The method of claim 12, wherein the second feeding rate is higher than the first feeding rate.

16. The method of claim 12, wherein no waterborne regulator or chain transfer agent is added.

17. The method of claim 12, wherein other additives comprise emulsifiers, initiators, chasers, and pH adjusters.

18. The method of claim 12, wherein the reactor is heated until reaction is complete.

19. An emulsion polymerization method to graft hydroxyethyl cellulose (HEC) to acrylic polymer to produce the HEC grafted acrylic polymer of claim 1 comprising the steps of
providing the HEC in a reactor water phase to form an HEC solution;
providing and neutralizing acrylic monomers in an emulsion container;
adding part of the acrylic monomer emulsion to HEC solution to form seeds;
feeding the remaining acrylic monomers at a first speed;
controlling the first feeding speed so that less than 28% monomer conversion in the first hour, and less than 68% monomer conversion after two hours;
feeding the acrylic monomers at a second speed, wherein the second feeding rate is higher than the first feeding rate; and
wherein the HEC-grafted acrylic polymer contains less than about 700 ppm of gels.

20. The method of claim 19, wherein no waterborne regulator or chain transfer agent is added.

21. The method of claim 19, wherein other additives comprise emulsifiers, initiators, chasers, and pH adjusters.

22. The method of claim 19, wherein the reactor is heated until reaction is complete.

23. An emulsion polymerization method to graft hydroxyethyl cellulose (HEC) to acrylic polymer to produce the HEC grafted acrylic polymer of claim 1 comprising the steps of
providing the HEC in a reactor water phase to form an HEC solution;
providing a seed monomer emulsion to the HEC solution;
feeding the acrylic monomers to the HEC solution;
controlling the solid content to be less than about 30% solids and controlling the particle size distribution to be uni-modal distribution;
cooling the monomer emulsion;
reducing the residual monomers;
adjusting the pH of the emulsion to between about 8.0 and about 8.8;
adding surfactants and initiator to the emulsion;
adding additional monomer emulsions;
wherein the average particle size (mV) of acrylic core is controlled between about 160 nm and about 280 nm; and
wherein the HEC-grafted acrylic polymer contains less than about 700 ppm of gels.

24. The method of claim 23, wherein the solid content is controlled to be about 10% to about 30% before adding monomers for the second time.

25. The method of claim 23, wherein no waterborne regulator or chain transfer agent is added.

26. The method of claim 23, wherein other additives comprise emulsifiers, initiators, chasers, and pH adjusters.

27. The method of claim 23, wherein the reactor is heated during each polymerization step.

* * * * *